United States Patent
Iwai

(10) Patent No.: US 10,817,322 B2
(45) Date of Patent: Oct. 27, 2020

(54) VIRTUAL MACHINE MANAGEMENT APPARATUS AND VIRTUAL MACHINE MANAGEMENT METHOD

(71) Applicant: FUJITSU LIMITED, Kawasaki-shi, Kanagawa (JP)

(72) Inventor: Kazuya Iwai, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 15/848,382

(22) Filed: Dec. 20, 2017

(65) Prior Publication Data

US 2018/0121231 A1 May 3, 2018

Related U.S. Application Data

(63) Continuation of application No. PCT/JP2015/069267, filed on Jul. 3, 2015.

(51) Int. Cl.
*G06F 9/455* (2018.01)
*G06F 9/50* (2006.01)

(52) U.S. Cl.
CPC .......... *G06F 9/45558* (2013.01); *G06F 9/505* (2013.01); *G06F 9/5077* (2013.01); *G06F 9/5083* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2004/0103373 A1 | 5/2004 | Wei | |
| 2011/0099403 A1 | 4/2011 | Miyata et al. | |
| 2011/0314158 A1 | 12/2011 | Soejima | |
| 2012/0023493 A1 | 1/2012 | Mori | |
| 2012/0198447 A1 | 8/2012 | Osogami et al. | |
| 2012/0233609 A1* | 9/2012 | Blythe | G06F 11/3409 718/1 |
| 2013/0227572 A1 | 8/2013 | Hosono | |
| 2013/0326506 A1* | 12/2013 | McGrath | G06F 9/45558 718/1 |

(Continued)

FOREIGN PATENT DOCUMENTS

| | | |
|---|---|---|
| JP | 05-12228 | 1/1993 |
| JP | 10-207849 | 8/1998 |

(Continued)

OTHER PUBLICATIONS

Ashkan Paya, "Energy-Aware Load Balancing and Application Scaling for the Cloud Ecosystem", Jan. 2015 (Year: 2015).*

(Continued)

*Primary Examiner* — Wynuel S Aquino
(74) *Attorney, Agent, or Firm* — Fujitsu Patent Center

(57) ABSTRACT

A virtual machine management apparatus includes a memory and a processor coupled to the memory and the processor configured to, perform, for each of applications executed in virtual machines, a determination of a tendency of a time when a load associated with execution of each of applications is low, select a certain virtual machine from the virtual machines based on the tendency of the time, and perform an assignment of a first application to the certain virtual machine.

13 Claims, 9 Drawing Sheets

36

| 0:00 ~ 4:00 | 4:00 ~ 8:00 | 8:00 ~ 12:00 | 12:00 ~ 16:00 | 16:00 ~ 20:00 | 20:00 ~ 24:00 |
|---|---|---|---|---|---|
| 0 | 0 | 0 | 1 | 0 | 0 |

(56) References Cited

U.S. PATENT DOCUMENTS

| | | | |
|---|---|---|---|
| 2015/0261274 A1* | 9/2015 | Ahnn | G06F 9/54 713/340 |
| 2016/0004553 A1* | 1/2016 | Torii | G06F 9/4856 718/1 |
| 2016/0011913 A1* | 1/2016 | Novikov | G06F 9/5077 718/1 |

FOREIGN PATENT DOCUMENTS

| | | | |
|---|---|---|---|
| JP | 2006-506748 | | 2/2006 |
| JP | 2009-176192 | A | 8/2009 |
| JP | 2011-090594 | | 5/2011 |
| JP | 2012-27614 | | 2/2012 |
| JP | 2012-159928 | A | 8/2012 |
| JP | 2012-181647 | | 9/2012 |
| WO | 2010/095579 | | 8/2010 |
| WO | 2013/018914 | | 2/2013 |

OTHER PUBLICATIONS

International Search Report and Written Opinion of the International Searching Authority(Form PCT/ISA/220, PCT/ISA/210, Form PCT/ISA/237), mailed in connection with PCT/JP2015/069267 and dated Oct. 6, 2015, with partial English translation (12 pages).
Japanese Office Action dated Apr. 2, 2019 for corresponding Japanese Patent Application No. 2017-526794 with, English Translation, 9 pages. *Please note JP-2011-90594-A, JP-2012-181647-A, JP-5-12228-A, JP-10-207849-A and JP-2012-27614-A cited herewith were previously cited in an IDS filed on Dec. 20, 2017.*.
Japanese Office Action dated Nov. 12, 2019 for corresponding Japanese Patent Application No. 2017-526794 with English Translation, 9 pages. * Please note JP-2012-181647-A, JP-5-12228-A, JP-10-207849-A, JP-2012-27614-A and JP-2011-90594-A cited herewith, were previously cited in an IDS filed on Dec. 20, 2017.*.

* cited by examiner

VIRTUAL MACHINE MANAGEMENT APPARATUS AND VIRTUAL MACHINE MANAGEMENT METHOD

CROSS-REFERENCE TO RELATED APPLICATIONS

This application is a continuation application of International Application PCT/JP2015/069267 filed on Jul. 3, 2015 and designated the U.S., the entire contents of which are incorporated herein by reference.

FIELD

The embodiment discussed herein is related to a virtual machine management apparatus and a virtual machine management method.

BACKGROUND

There has been known PaaS (Platform as a Service) which provides an application execution platform as a cloud computing service. In a PaaS environment, when an application developer uploads an application, an operation program determines a virtual machine (VM) for an instance of the application (application instance, or app instance) to be deployed to. Note that an instance is a unit for processing data. Hereinafter, an application instance is simply called an instance.

In order to reduce the operation cost, the operator of PaaS appropriately determines a location to which an instance to be newly made is disposed when performing deployment and scaling of an instance and minimizes the VM resources (for example, a storage) to be used. Conventional distributed processing systems dispose an instance to a VM such that instances of applications using the same resource (for example, a storage) are deployed to the same VM.

FIG. 9 is a diagram for explaining a method of disposing instances of applications to VMs according to a conventional method of managing virtual machines. FIG. 9 illustrates an example of disposing instances of four applications A, B, C, and D to multiple VMs in a PaaS environment. In FIG. 9, reference signs 01A, 01B, 01C, and 01D indicate instances of the applications A, B, C, and D, respectively. Hereinafter, an instance of the application A is denoted by an instance 01A using the reference sign 01A. Similarly, an instance of the application B is denoted by an instance 01B using the reference sign 01B, and an instance of the application C an instance 01C using the reference sign 01C. Also, an instance of the application D is denoted by an instance 01D using the reference sign 01D.

In addition, assume that the applications A, B, C, and D use different resources. As described above, conventional distributed processing systems deploy instances of applications using the same resource to the same VM. Accordingly, as illustrated in FIG. 9, multiple instances 01A of the application A are deployed together to the same VM. Similarly, multiple instances 01B, 01C, and 01D of the applications B, C, and D are deployed together to the same VMs.

Thus, in the case where the applications A, B, C, and D use different resources, the instances 01A, 01B, 01C, and 01D are deployed to different VMs. Here, in the state illustrated in FIG. 9, an instance 01A' of the application A and an instance 01C' of the application C are further added by scale-out. In such a case, according to the conventional method of managing virtual machines, the instance 01A' is deployed to an existing VM in which the instances 01A are running, and the instance 01C' is deployed to an existing VM in which the instances 01C are running.

In addition, in the management of virtual machines, VM resources are efficiently used by performing scale-in which deletes from a VM an instance not being executed, or by deleting a VM, in which no instance is being executed, by scale-in.

For example, related art is disclosed in Japanese National Publication of International Patent Application No. 2006-506748, and International Publication Pamphlet Nos. WO 2010/095579 and WO2013/018914.

SUMMARY

According to an aspect of the invention, a virtual machine management apparatus includes a memory and a processor coupled to the memory and the processor configured to, perform, for each of applications executed in virtual machines, a determination of a tendency of a time when a load associated with execution of each of applications is low, select a certain virtual machine from the virtual machines based on the tendency of the time, and perform an assignment of a first application to the certain virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the conventional method of managing virtual machines, instances of applications using the same resource are deployed to the same VM. This makes it sometimes impossible to delete multiple deployed instances by scale-in in a VM at the same timing. Consequently, there is a case where while there is an instance that may be deleted by scale-in, an instance unable to be deleted by scale-in remains indefinitely.

Figure 9:
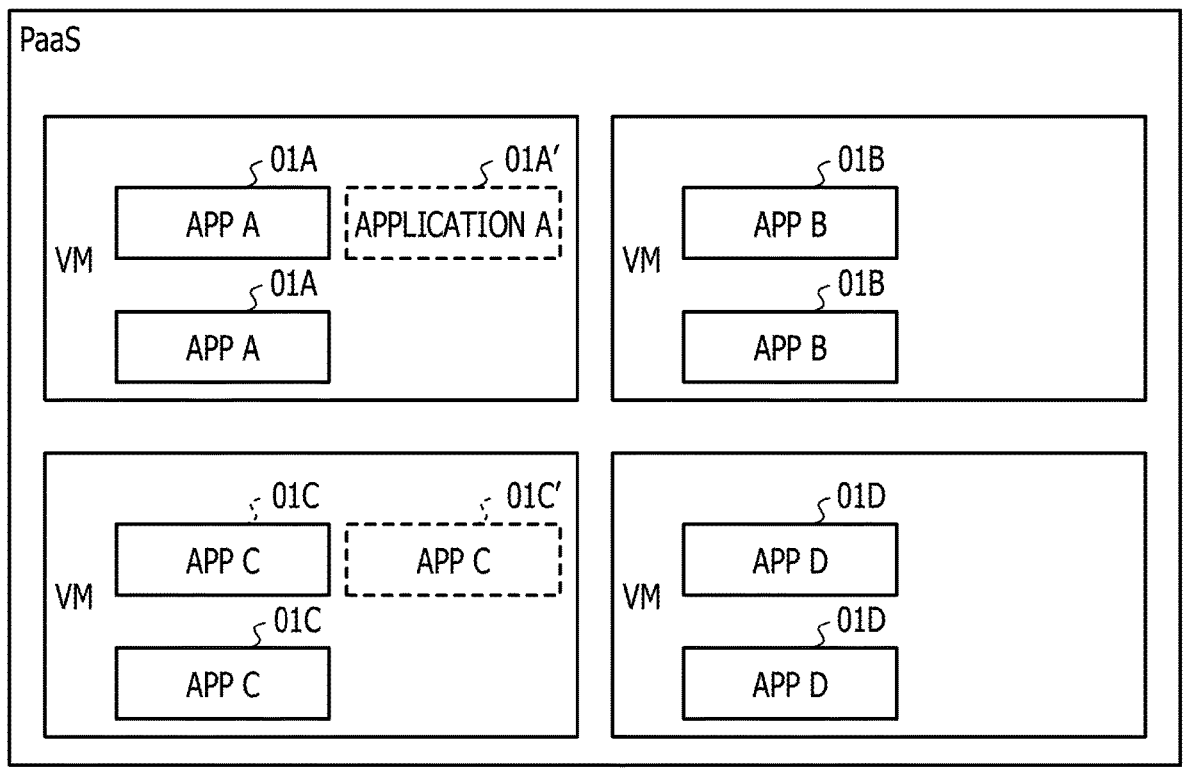
FIG. 9 is a diagram for explaining a method of disposing instances of applications to VMs according to a conventional method of managing virtual machines.

While an instance unable to be deleted by scale-in remains in a VM, it is impossible to delete the VM by scale-in. For example, in the example illustrated in FIG. 9, also in the case where each of the instances 01A' and 01C' added as described above is deleted by scale-in from the VMs, it is impossible to delete these VMs by scale-in because the instances 01A and 01C are operating in the VMs. As a result, for example, there is a problem that it is impossible to use the VM resources efficiently because there are multiple VMs in which a small number of instances are operating.

Hereinafter, descriptions are provided for an embodiment according to the present virtual machine management program, virtual machine management apparatus, and virtual machine management method, with reference to the drawings. Here, the embodiment described below is a mere example and is not intended to exclude various modifications or applications of techniques that are not explicitly described in the embodiment. In other words, various modifications of the present embodiment may be implemented without departing from the gist thereof. In addition, each figure does not mean that the figure only includes the illustrated constituents, and may include other functions or the like.

(A) Configuration

Figure 1:
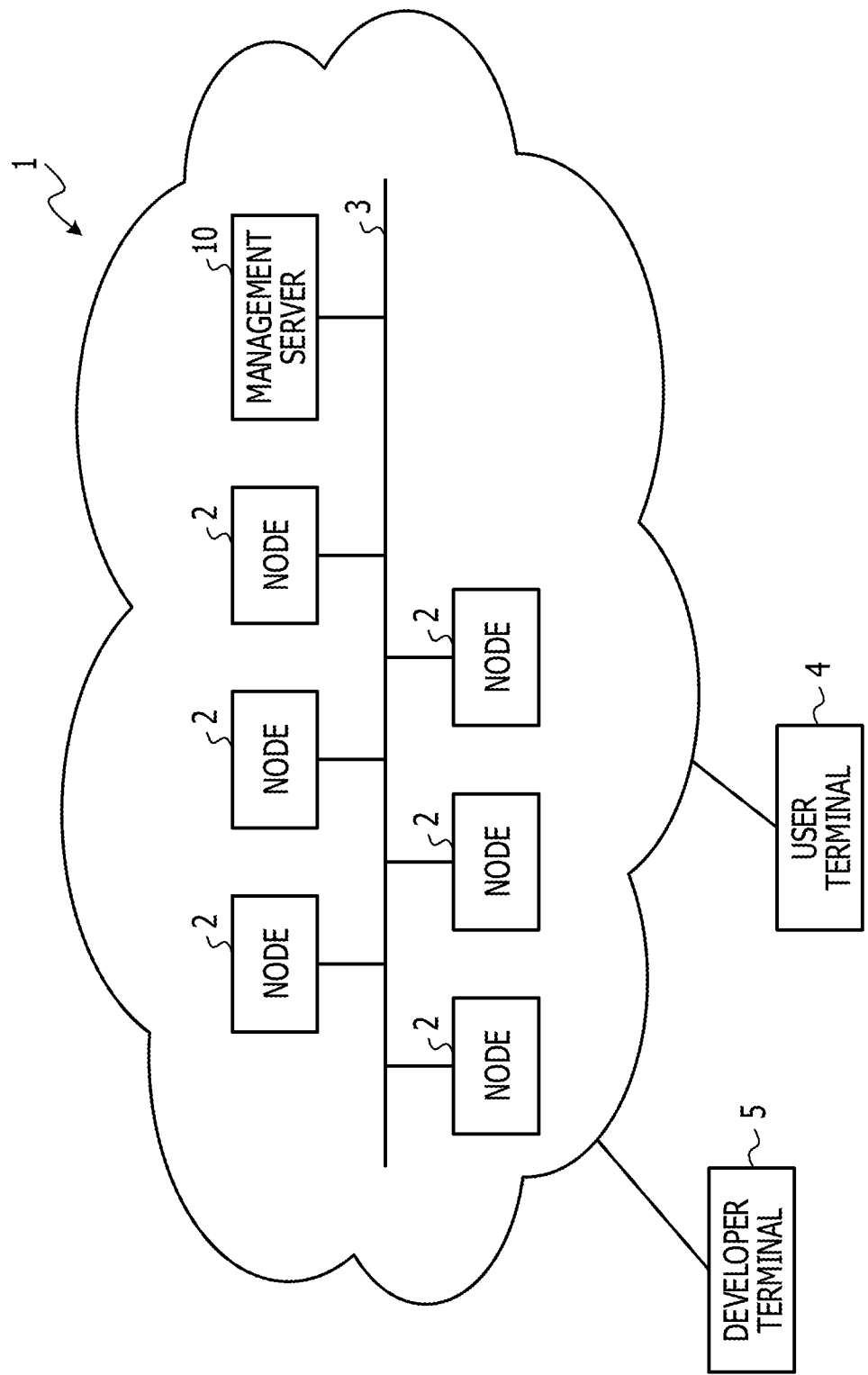
FIG. 1 is a diagram illustrating an example of a computer system including a virtual machine management apparatus as an example of an embodiment.
Figure 2:
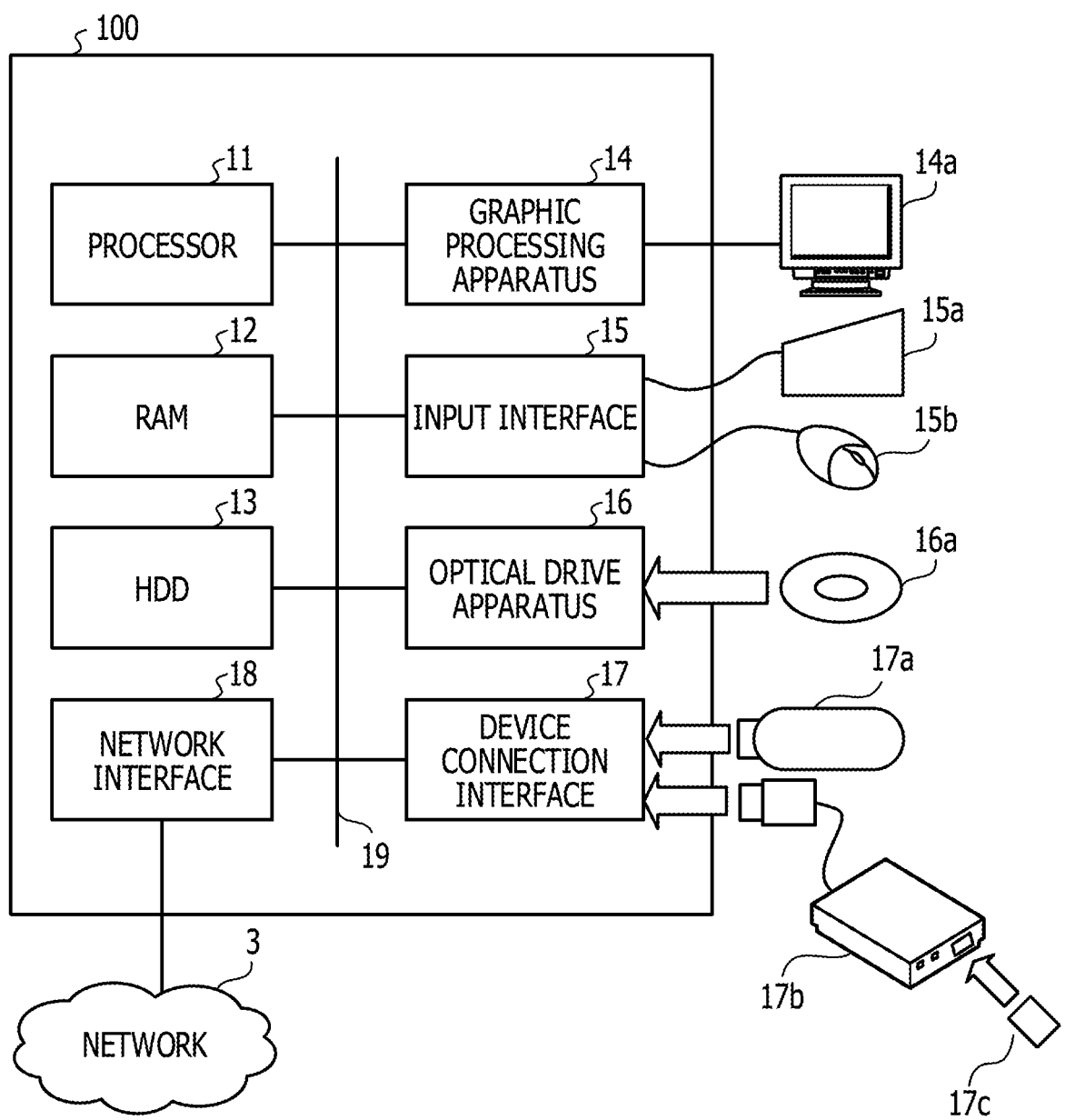
FIG. 2 is a diagram illustrating a hardware configuration of a management server functioning as the virtual machine management apparatus as the example of the embodiment.
Figure 3:
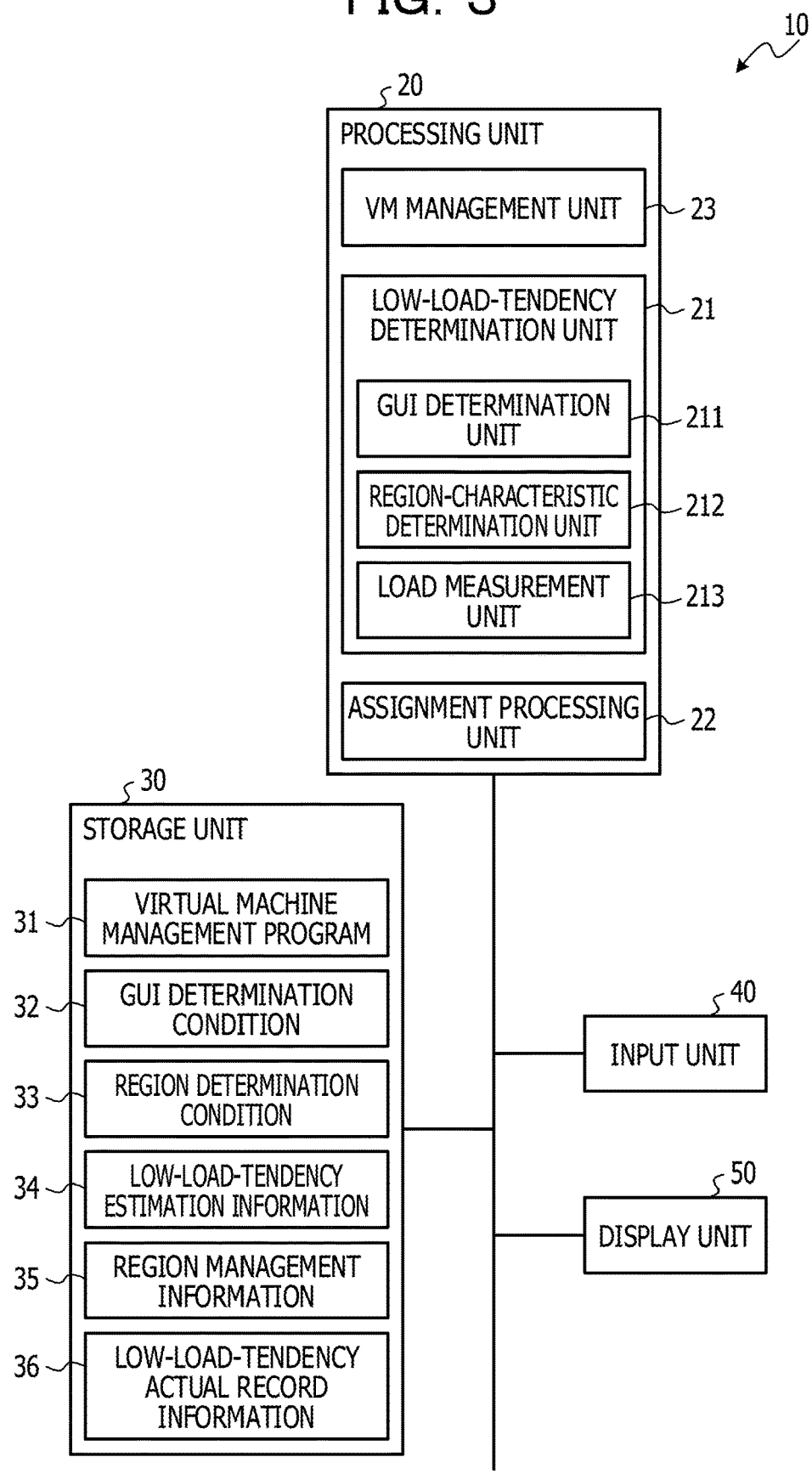
FIG. 3 is a diagram illustrating a functional configuration of the management server functioning the virtual machine management apparatus as the example of the embodiment.

FIG. 1 is a diagram illustrating an example of a computer system including a virtual machine management apparatus as an example of the embodiment, FIG. 2 is a diagram illustrating the hardware configuration of a management server functioning as the virtual machine management apparatus, and FIG. 3 is a diagram illustrating the functional configuration of the virtual machine management apparatus. The computer system 1 illustrated in FIG. 1 includes the management server (virtual machine management apparatus) 10 and multiple (five in the example illustrated in FIG. 1) node computers 2 (hereinafter simply called nodes 2), which are connected to each other via a network 3.

In addition, to the computer system 1 are communicably connected a developer terminal 5 and a user terminal 4. Each node 2 is a computer including a not-illustrated processor and memory and provides various functions by the processor executing a program. For example, the node 2 provides part of its resources such as the processor and the memory for execution of virtual machines (VMs) managed by the management server 10, and executes processing assigned by the management server 10. In other words, the node 2 executes at least part of the function as a virtual machine.

The developer terminal 5 is a computer used by a provider of an application program (application). The provider transmits an application to the management server 10 using this developer terminal 5 to upload the application to this computer system 1. The application is, for example, a web application (web app). A web app is application software used via a network and operates by cooperation between a program in a programming language such as JavaScript (registered trademark) which operates on a web browser, and a program on the web server side.

Note that as for the applications, there are user intervention type applications which involve input operations and checking processes by users for execution and user non-intervention type applications which operate without bothering users. The user intervention type applications are, for example, applications such as a word processor, spreadsheet, game, and the like. The user non-intervention type applications are, for example, applications for data processing which perform calculation, analysis, and the like by batch processing.

The user terminal 4 is a computer used by a user, which includes a not-illustrated processor and memory and provides various functions by the processor executing a program. For example, a web browser is executed in the user terminal 4, and a user uses an application (web app) on the web browser. In other words, using this user terminal 4, the user operates a user intervention type application or gives an execution instruction to a user non-intervention type application.

The management server 10 is a computer (server computer) including server functions and provides a virtualized development environment and execution environment using hardware resources and software resources of the multiple nodes 2. This embodiment illustrates an example in which the management server 10 uses a PaaS environment as a virtualization system. The management server 10 functions as a virtual machine management apparatus which implements multiple VMs using resources of multiple nodes 2 and assigns instances of foregoing applications to these VMs to cause the VMs to execute the instances.

First, with reference to FIG. 2, descriptions are provided for the hardware configuration of the management server 10 functioning as a virtual machine management apparatus of this embodiment. The management server 10 includes as its constituents, for example, a processor 11, random access memory (RAM) 12, hard disc drive (HDD) 13, graphic processing apparatus 14, input interface 15, optical drive apparatus 16, device connection interface 17, and network interface 18. These constituents 11 to 18 are capable of communicating with each other via a bus 19.

The processor (processing unit) 11 controls the entire management server 10. The processor 11 may be a multi-processor. The processor 11 may be, for example, one of a central processing unit (CPU), micro processing unit (MPU), digital signal processor (DSP), application specific integrated circuit (ASIC), programmable logic device (PLD), and field programmable gate array (FPGA). The processor 11 may be a combination of two or more devices of the CPU, MPU, DSP, ASIC, PLD, and FPGA.

The RAM (storage unit) 12 is used as a main storage apparatus of the management server 10. In the RAM 12 temporarily stores at least part of an operating system (OS) program and application programs which are executed by the processor 11. In addition, in the RAM 12 stores various data used for processing by the processor 11. The application programs may include a virtual machine management program (see the reference sign 31 in FIG. 3) which the processor 11 executes to cause the management server 10 to implement virtual machine management functions of this embodiment.

The HDD (storage unit) 13 writes and reads data magnetically into and out of a built-in disk. The HDD 13 is used as an auxiliary storage apparatus of the management server 10. Stored in the HDD 13 is an OS program, application programs, and various data. Note that a semiconductor storage apparatus (SSD: solid state drive) such as a flash memory may be used as an auxiliary storage apparatus.

To the graphic processing apparatus 14 is connected a monitor 14a. The graphic processing apparatus 14 displays images on the screen of the monitor 14a in accordance with instructions from the processor 11. Examples of the monitor 14a include a display apparatus having a cathode ray tube (CRT) and a liquid crystal display apparatus. To the input interface 15 are connected a keyboard 15a and a mouse 15b. The input interface 15 transmits signals sent from the keyboard 15a and the mouse 15b to the processor 11. Note that the mouse 15b is an example of a pointing device, and another pointing device may be used. Examples of another pointing device include a touch panel, tablet, touch pad, track ball, or the like.

The optical drive apparatus 16 reads data stored in an optical disk 16a using laser light or the like. The optical disk 16a is a portable non-transitory recording medium on which data is recorded to be readable by reflection of light. Examples of the optical disk 16a include the Digital Versatile Disc (DVD), DVD-RAM, Compact Disc Read Only Memory (CD-ROM), CD-R (Recordable)/RW (ReWritable).

The device connection interface 17 is a communication interface to connect peripheral devices to the management server 10. For example, it is possible to connect a memory apparatus 17a or a memory reader-writer 17b to the device connection interface 17. The memory apparatus 17a is a non-transitory recording medium having a function to communicate with the device connection interface 17, for example, a Universal Serial Bus (USB) memory. The memory reader-writer 17b writes or reads data into or out of a memory card 17c. The memory card 17c is a card-shaped non-transitory recording medium.

The network interface 18 is connected to the network 3. The network interface 18 transmits and receives data to and from other computers, such as the nodes 2, developer terminal 5, and user terminal 4, or communication devices, via the network 3. With the management server 10 having the hardware configuration as described above, it is possible to implement virtual machine management functions of this embodiment, which are to be described later.

Note that the management server 10 provides the virtual machine management functions of this embodiment, for example, by executing a program (such as a virtual machine management program) recorded in a computer-readable non-transitory recording medium. The program in which the contents of processing executed by the management server 10 are written may be recorded in various recording mediums. For example, the program to be executed by the management server 10 may be stored in the HDD 13. The processor 11 loads at least part of the program stored in the HDD 13 into the RAM 12, and executes the loaded program.

Alternatively, the program to be executed by the management server 10 (processor 11) may be recorded in a non-transitory portable recording medium, such as the optical disk 16a, memory apparatus 17a, memory card 17c, or the like. After the program stored in the portable recording medium is installed into the HDD 13, for example, with the control by the processor 11, the program becomes executable. Alternatively, the processor 11 may read the program directly from the portable recording medium to execute it.

Next, with reference to FIG. 3, descriptions are provided for the functional configuration of the management server (information processing apparatus, or computer) 10 having the virtual machine management functions of this embodiment. FIG. 3 is a block diagram illustrating an example of the functional configuration. The management server 10 performs functions of managing virtual machines (VMs) and assigning instances of applications to the VMs. For this reason, as illustrated in FIG. 3, the management server 10 includes at least functions as a processing unit 20, storage unit 30, input unit 40, and display unit 50.

The processing unit 20 is, for example, the processor 11 illustrated in FIG. 2 and performs functions as a VM management unit 23, low-load-tendency determination unit 21, and assignment processing unit 22 to be described later, by executing the foregoing virtual machine management program 31. The storage unit 30 is, for example, the RAM 12 and the HDD 13 illustrated in FIG. 2, and saves and stores various information for implementing the virtual machine management functions. The various information includes, in addition to the foregoing virtual machine management program 31, graphical user interface (GUI) determination condition 32, region determination condition 33, low-load-tendency actual record information 36, low-load-tendency estimation information 34, region management information 35, and the like. Note that details of the GUI determination condition 32, region determination condition 33, low-load-tendency actual record information 36, low-load-tendency estimation information 34, and region management information 35 are described later.

The input unit 40 is, for example, the keyboard 15a and the mouse 15b illustrated in FIG. 2, is operated by a system administrator or the like, and issues various instructions. Note that a touch panel, tablet, touch pad, track ball, or the like may be used instead of the mouse 15b. The display unit 50 is, for example, the monitor 14a illustrated in FIG. 2, and displays various information to be presented to the system administrator or the like, such as an error notification.

As described above, the virtual machine management program 31 causes the processing unit 20 (processor 11) to perform the virtual machine management functions. Next, descriptions are provided for functions as the VM management unit 23, low-load-tendency determination unit 21, and assignment processing unit 22 implemented by the processing unit 20 (processor 11). The VM management unit 23 creates multiple VMs using resources of the multiple nodes 2 included in this computer system 1, and also manages these VMs. The VM management unit (virtual machine management unit) 23 also performs scale-in which deletes a VM and scale-out which adds a VM.

Note that various known approaches may be used to create and manage VMs, and descriptions thereof are omitted. The low-load-tendency determination unit 21 determines the tendency of the time when the load of the hardware to execute an application and applications (instances) already running on respective VMs decreases. Hereinafter, for the sake of convenience, the load of the hardware to execute an application is simply called the load of the application.

As illustrated in FIG. 3, the low-load-tendency determination unit 21 includes functions as a load measurement unit 213, graphical user interface (GUI) determination unit 211, and region-characteristic determination unit 212. The load measurement unit 213 measures the hardware load due to execution of each instance with regard to application instances already assigned to VMs. As the hardware load of a node computer 2 used to execute instances, the load measurement unit 213 measures, for example, a CPU usage rate, memory usage rate, and disk I/O.

Figure 4:
FIG. 4 is a diagram illustrating an example of low-load-tendency actual record information in the management server functioning the virtual machine management apparatus as the example of the embodiment.

In this way, the load measurement unit 213 measures the hardware load due to execution of each instance with regard to the application instances already assigned to VMs. In addition, based on the measured hardware load, the load measurement unit 213 creates low-load-tendency actual record information 36 on each application already assigned to VMs. FIG. 4 is a diagram illustrating an example of the low-load-tendency actual record information 36 on the management server functioning as a virtual machine management apparatus as an example of the embodiment.

In this low-load-tendency actual record information 36 illustrated in FIG. 4, information ("0" or "1") indicating whether the load is low is associated with each of the multiple time zones (six time zones in the example illustrated in FIG. 4: 0:00 to 4:00, 4:00 to 8:00, 8:00 to 12:00, 12:00 to 16:00, 16:00 to 20:00, and 20:00 to 24:00). In the low-load-tendency actual record information 36, the load measurement unit 213 sets "0" to the time zones when the load is low and "1" to the time zones when the load is not low, as the information indicating whether the load is low.

For example, the load measurement unit 213 compares actual measured values, measured as described above, of the hardware load of the node computer 2 used for execution of instances (the CPU usage rate, memory usage rate, and disk I/O) with predetermined thresholds for each of the foregoing time zones. When one of the actual measured values of the CPU usage rate, memory usage rate, and disk I/O is larger than or equal to the threshold, the load measurement unit 213 sets "1" indicating that the load is not low to the corresponding time zone in the low-load-tendency actual record information 36. On the other hand, when any of the actual measured values of the CPU usage rate, memory usage rate, and disk is smaller than the threshold, the load measurement unit 213 sets "0" indicating that the load is low to the corresponding time zone in the low-load-tendency actual record information 36.

In other words, these pieces of information indicating whether the load is low, set for every time zone in the low-load-tendency actual record information 36 function as information indicating the tendency of the time when the load of each application executed in a VM is low. Note that the structure of the low-load-tendency actual record information 36 is not limited to the example illustrated in FIG. 4 but may be modified as appropriate. For example, although the low-load-tendency actual record information 36 illustrated in FIG. 4 is divided into six time zones, each having four hours, the structure is not limited to this. The low-load-tendency actual record information 36 may be divided into five or less, or seven or more time zones. In addition, in the example illustrated in FIG. 4, "0" is set to the time zones when the load is low, and "1" to the time zones when the load is not low. These settings are not limited to the above, but may be modified as appropriate.

The low-load-tendency actual record information 36 created as described above is stored in a specified area or the like in the storage unit 30, being associated with information (for example, an application ID) identifying the application. Hereinafter, an application running on a VM in this computer system 1 may be called an existing application or an existing app.

The load measurement unit 213 measures the hardware load associated with execution of an existing app and manages the hardware load by the time (for every time zone) to manage information indicating the tendency of the time when the hardware load by the existing app is low. In addition, the load measurement unit 213 periodically acquires (monitors) the CPU usage rate, memory usage rate, and disk I/O associated with the existing application, and updates the low-load-tendency actual record information 36.

The GUI determination unit 211 determines the necessity of manual operation for using an application newly uploaded to this computer system 1 to judge the tendency of the time when the load of the application is low. Specifically, the GUI determination unit 211 determines the necessity of manual operation for using the application, based on whether the uploaded application has a GUI. In other words, the GUI determination unit 211 determines whether the application is a user intervention type application by determining whether the application has a GUI which is an input operation interface function.

Since an application having a GUI is a user intervention type application assumed to be operated by a person, it is thought that the application is, in general, often used in the daytime and rarely used in the nighttime. Thus, it is possible to judge that the load of a user intervention type application involving manual operation to use the application is low in time zones in the nighttime.

As for a newly uploaded application, since the hardware load associated with execution of the application has not been measured, the time when the hardware load is low is unknown. However, in the case where the application is a user intervention type application, it is possible to judge that the load is low in the time zones in the nighttime. Accordingly, in this computer system 1, the low-load-tendency determination unit 21 (GUI determination unit 211) estimates that the hardware load of a user intervention type application is low in the time zones in the nighttime (for example, 20:00 to 8:00).

Hereinafter, in this computer system 1, an application newly uploaded into this computer system 1 may be called a new application or a new app. The GUI determination unit 211 uses the GUI determination condition 32 to judge whether a new application is a user intervention type application, in other words, whether the new application has a GUI.

The GUI determination condition 32 is information (conditions) which the GUI determination unit 211 uses to determine whether an application has a GUI. The GUI determination unit 211 judges that an application has a GUI, if the application meets any one of the following conditions 1 to 3 set as the GUI determination condition 32. [Condition 1] The application includes any one of files of HTML, CSS, and JavaScript.

Specifically, the application includes a file having an extension of any one of ".html", ".css", and ".js". [Condition 2] The application uses a specific template engine (for example, Jade, HAML, or Mustache). For example, if the application includes a file having the extension ".jade", it is possible to judge that the template engine Jade is used.

If the application includes a file having the extension ".haml", it is possible to judge that the template engine HAML is used. If the application includes a file having the extension ".mastache", it is possible to judge that the template engine Mustache is used. [Condition 3] In the case where the application does not meet either condition 1 or 2 described above, the application has a GUI function in accordance with the language (programming language) used to program the application.

The following are examples of conditions to determine whether a GUI function is included, with regard to five programming languages: Java (registered trademark), Ruby, Node.js (registered trademark), Python (registered trademark), and PHP.

(1) In the case where the programming language is Java, the application meets any one of the following conditions: "the application includes a file having the extension ".war"", "the application uses JSP (JavaServer Pages)" and "the application uses Apache Velocity as a template engine".

Note that if the application includes a file having the extension ".jsp", it is possible to judge that the application uses JSP. If the application includes a file having the extension ".vm", it is possible to judge that the application uses Apache& #160;Velocity as a template engine.

(2) In the case where the programming language is Ruby, the application meets a condition that "the application uses erb as a template engine" or a condition that "the application uses a library such as ERB related to creation of HTML in the source codes".

Note that if the application includes a file having the extension ".erb", it is possible to judge that the application uses erb as a template engine.

(3) In the case where the programming language is Node.js, the application uses EJS as a template engine. Note that if the application includes a file having the extension ".ejs", it is possible to judge that the application uses EJS as a template engine.

(4) In the case where the programming language is Python, the application uses Jinja2,& #160;Mako as a template engine. Note that if the application includes a file having the extension ".jinja2", it is possible to judge that the application uses Jinja2 as a template engine. If the application includes a file having the extension ".mak" or ".mako", it is possible to judge that the application uses Mako as a template engine.

(5) In the case where the programming language is PHP, the application uses one of Smarty, Twig, and PHPTAL as a template engine. Note that if the application includes a file having the extension ".tpl", it is possible to judge that the application uses Smarty as a template engine. If the application includes a file having the extension ".twig", it is possible to judge that the application uses Twig as a template engine.

Further, if the application includes a file having the extension ".phptal", it is possible to judge that the application uses PHPTAL as a template engine. Note that it is possible to determine the programming language (application programming language), for example, using following methods (a) to (e).

(a) If the application includes a file named pom.xml in the root directory, the programming language is Java.

(b) If the application includes Gemfile, the programming language is Ruby.

(c) If the application includes package.json, the programming language is Node.js.

(d) If the application includes either requirements.txt or setup.py, the programming language is Python.

(e) If the application includes a file having the extension ".php", the programming language is PHP.

If the application does not meet any one of the above conditions 1 to 3, the GUI determination unit 211 determines that the application does not have a GUI. If the application does not meet either the above condition 1 or 2, and it is impossible regarding the condition 3 to determine the programming language of the application, the GUI determination unit 211 determines that whether the application has a GUI is unknown.

The GUI determination unit 211 creates the low-load-tendency estimation information 34 based on the determination result indicating whether a new application has a GUI. The low-load-tendency estimation information 34 is information indicating estimated load condition of the node 2 associated with execution of a new application when the new application is executed, and indicates the load condition for every time zone.

Figure 5:
FIG. 5 is a diagram illustrating an example of low-load-tendency estimation information of the management server functioning the virtual machine management apparatus as the example of the embodiment.

FIG. 5 is a diagram illustrating an example of the low-load-tendency estimation information 34 on the management server functioning as a virtual machine management apparatus as an example of the embodiment. In this computer system 1, the GUI determination unit 211 judges whether a new application is a user intervention type application. If the new application is a user intervention type application, the GUI determination unit 211 estimates that the hardware load is low in the time zones corresponding the nighttime (for example, 20:00 to 8:00). The low-load-tendency estimation information 34 is created based on the estimation as above.

The low-load-tendency estimation information 34 has the same structure as that of the low-load-tendency actual record information 36 illustrated in FIG. 4. In other words, in the low-load-tendency estimation information 34 illustrated in FIG. 5, information ("0" or "1") indicating whether the load is low is associated with each of the multiple time zones (six time zones in the example illustrated in FIG. 5: 0:00 to 4:00, 4:00 to 8:00, 8:00 to 12:00, 12:00 to 16:00, 16:00 to 20:00, and 20:00 to 24:00).

In the low-load-tendency estimation information 34, the GUI determination unit 211 sets "0" to the time zones when the load is expected to be low and "1" to the time zones when the load is expected to be not low, as the information indicating whether the load is low. In other words, these pieces of information indicating whether the load is low, set for every time zone in the low-load-tendency estimation information 34 function as information indicating (the estimation of) the tendency of the time when the load of the application is low.

If the application does not have a GUI, or it is unknown whether the application has a GUI, the GUI determination unit 211 sets "2" to all time zones in the low-load-tendency estimation information 34. Note that the structure of the low-load-tendency estimation information 34 is not limited to the example illustrated in FIG. 5 but may be modified as appropriate. For example, although the low-load-tendency estimation information 34 illustrated in FIG. 5 is divided into six time zones, each having four hours, the structure is not limited to this. The low-load-tendency estimation information 34 may be divided into five or less, or seven or more time zones. In addition, in the example illustrated in FIG. 5, "0" is set to the time zones when the load is low, "1" to the time zones when the load is not low, and if the application does not have a GUI, or it is unknown whether the application has a GUI, "2" is set to all the time zones. These settings are not limited to these, but may be modified as appropriate.

The low-load-tendency estimation information 34 created as described above is stored in a specified area or the like in the storage unit 30, being associated with information (for example, an application ID) identifying the application. The region-characteristic determination unit 212 determines the regional characteristic (for example, the country where the application is used) of a new application to judge the tendency of the time when the load of the new application is low. In other words, the region-characteristic determination unit 212 determines what region the application is to be used in.

As described before, the user intervention type application having a GUI is often used in the daytime, and rarely used in the nighttime. Then, in the case where such an application is used only in a specific region (country), it is possible to judge that the load is low in the time zones in the nighttime of the region. In addition, there is a difference in the tendency of the time when the load is low between an application widely used all over the world and an application used only in a specific region.

The region-characteristic determination unit 212 uses the region determination condition 33 to identify the regional characteristic of the application, in other words, the region where the application is mainly (frequently) used. The region determination condition 33 is information (conditions) which the GUI determination unit 211 uses to determine the region where the application is used. For example, as the region determination condition 33, region determination factors such as the language (display language) used in the GUI, the help function, or the like of an application, the domain (top level domain, top domain) of the top page of a web app, or the like, are associated with the region ID (identification). The region ID is identification information to identify the region.

These region determination factors may be extracted from the source data or the like of an application uploaded to the management server 10. Alternatively, it is possible to have the developer or the like of the application input these region determination factors in advance and manage the inputted region determination factors in the management server 10, associating the inputted region determination factors with the application. The region-characteristic determination unit 212 refers to the region determination condition 33 based on the display language used in the GUI or the like of a new application or the top domain of a web app, and determines the region ID corresponding to the new application. In this way, the GUI determination unit 211 determines the region where a new application is to be used.

Note that in the case where different region determination factors indicate different regions, such as the case where the display language is Japanese while the top domain indicates the U.S.A., it is desirable that the region corresponding to the display language be preferentially employed, for example. In other words, it is desirable to assign weights to the region determination factors. The region ID determined by the region-characteristic determination unit 212 is stored in a specified area or the like of the storage unit 30 as the region management information 35, being associated with information (for example, an application ID) identifying the new application.

In addition, also for existing applications, the region-characteristic determination unit 212 controls to store the region IDs determined for the existing applications as the region management information 35, associating the region IDs with information (for example, application IDs) identifying the existing applications. Note that for the region IDs of existing applications, it is possible to use, for example, values determined when the existing applications were uploaded to this computer system 1.

The foregoing low-load-tendency determination unit 21 (GUI determination unit 211, region-characteristic determination unit 212), for example, when an application is uploaded from the developer terminal 5 to the management server 10, sets the low-load-tendency estimation information 34 and the region management information 35 for the uploaded application. The low-load-tendency determination unit 21 (load measurement unit 213), after the assignment processing unit 22 described later deploys instances of the application to VMs, monitors the processor usage rate (CPU usage rate), RAM 12 usage amount (memory usage amount), and I (Input)/O (Output) to/from the HDD 13 (disk I/O) associated with the application, as the load information. The monitor result obtained from the monitoring is, for example, stored in the storage unit 30 as the low-load-tendency actual record information 36.

The assignment processing unit 22 selects a VM for an instance of an application to be deployed to, out of multiple VMs, based on the foregoing low-load-tendency actual record information 36, low-load-tendency estimation information 34, and region management information 35 set by the foregoing low-load-tendency determination unit 21 (the GUI determination unit 211, region-characteristic determination unit 212, and load measurement unit 213). For example, when an application is uploaded from the developer terminal 5 to the management server 10, the assignment processing unit 22 selects a VM for an instance of this uploaded new application to be deployed to.

Specifically, when determining a VM for an instance of a new application to be deployed to, the assignment processing unit 22 selects out of multiple VMs, a VM in which an instance of an application, whose region ID set in the region management information 35 is the same as that for the new application, and whose information indicating the tendency of the time when the load is low in the low-load-tendency estimation information 34 is the same as or similar to that for the new application, is already running. Note that the case where two pieces of information indicating the tendency of the time when the load is low are similar to each other is, for example, a case where the number of disagreements between the two pieces of the information indicating the tendency of the time when the load is low is smaller than or equal to a predetermined threshold (for example, one).

Then, the assignment processing unit 22 assigns the instance of the application to the VM selected as above. When assigning the instance of the application to the selected VM, the assignment processing unit 22 checks the availability of the VM. In other words, the assignment processing unit 22 checks if the selected VM has a vacancy (hardware resources and software resources) to which the instance may be assigned. If the selected VM has a vacancy (available resources) to which the instance may be assigned, the assignment processing unit 22 assigns the instance to the VM.

On the other hand, if the selected VM for deployment does not have a vacancy for a new instance to be deployed to, the assignment processing unit 22 causes the VM management unit 23 to perform scale-out of the VM and deploys the instance of the application to the VM added by this scale-out. Also, when scale-out of an application is performed, the assignment processing unit 22 determines a VM to which an instance of the application added by the scale-out is to be deployed.

The assignment processing unit 22 determines a VM to which an instance of a new application or an instance of an application added by scale-out is to be deployed, in accordance with the following criteria (1) and (2).

(1) Instances of applications whose region IDs are the same, whose pieces of information indicating the tendency of the time when the load is low are the same or similar, and in which the time when the load is low does not vary, are deployed to the same VM.

(2) Instances of applications whose region IDs are the same, and in which the time when the load is low varies are deployed to the same VM.

Here, the state where the time when the load is low does not vary means, for example, that the load is low at a specific time (in a time zone), such as a case where the load is low in the time zone 16:00 to 20:00 every day or in the time zone 12:00 to 16:00 on Monday. Deploying instances of applications, the loads of which are low at the same time, to the same VM makes it possible to increase chances to perform scale-in.

In addition, that the time when the load is low varies means that the time when the load is low is not the same. Assume the case where an instance of an application (for example, application C) in which the time when the load is low varies is deployed to a VM to which instances of applications (for example, applications A and B) in which the times when the load is low are the same have already been deployed. In such a case, even if the load due to the instances of the applications A and B becomes low, and the instances of the applications A and B are deleted by scale-in, it is impossible to delete the VM by scale-in because the application C remains in the VM.

In light of the above, instances of applications in which the time when the load is low varies are deployed to the same VM. This makes it possible to delete the VM by scale-in when the loads of the instances of the applications in which the times when the load is low are the same become low, and the instances of the applications are deleted by scale-in. For example, when the load measurement unit 213 periodically monitors the hardware load of an existing application and updates the low-load-tendency actual record information 36, if the contents of the low-load-tendency actual record information 36 are not changed, it is judged that the time when the load is low does not vary. On the other hand, if the periodic monitoring of the hardware load of an existing application changes the contents of the low-load-tendency actual record information 36, it is judged that the time when the load is low varies.

Note that the judgement result of whether the time when the load is low varies or does not vary is stored in the RAM 12 or the like, being associated with the low-load-tendency actual record information 36. Here, if a VM for deployment does not have a vacancy for an instance of an application to be newly deployed to, the assignment processing unit 22 causes the VM management unit 23 to perform scale-out of a VM and deploys the instance of the application to the VM added by the scale-out.

(B) Operation

Figure 6:
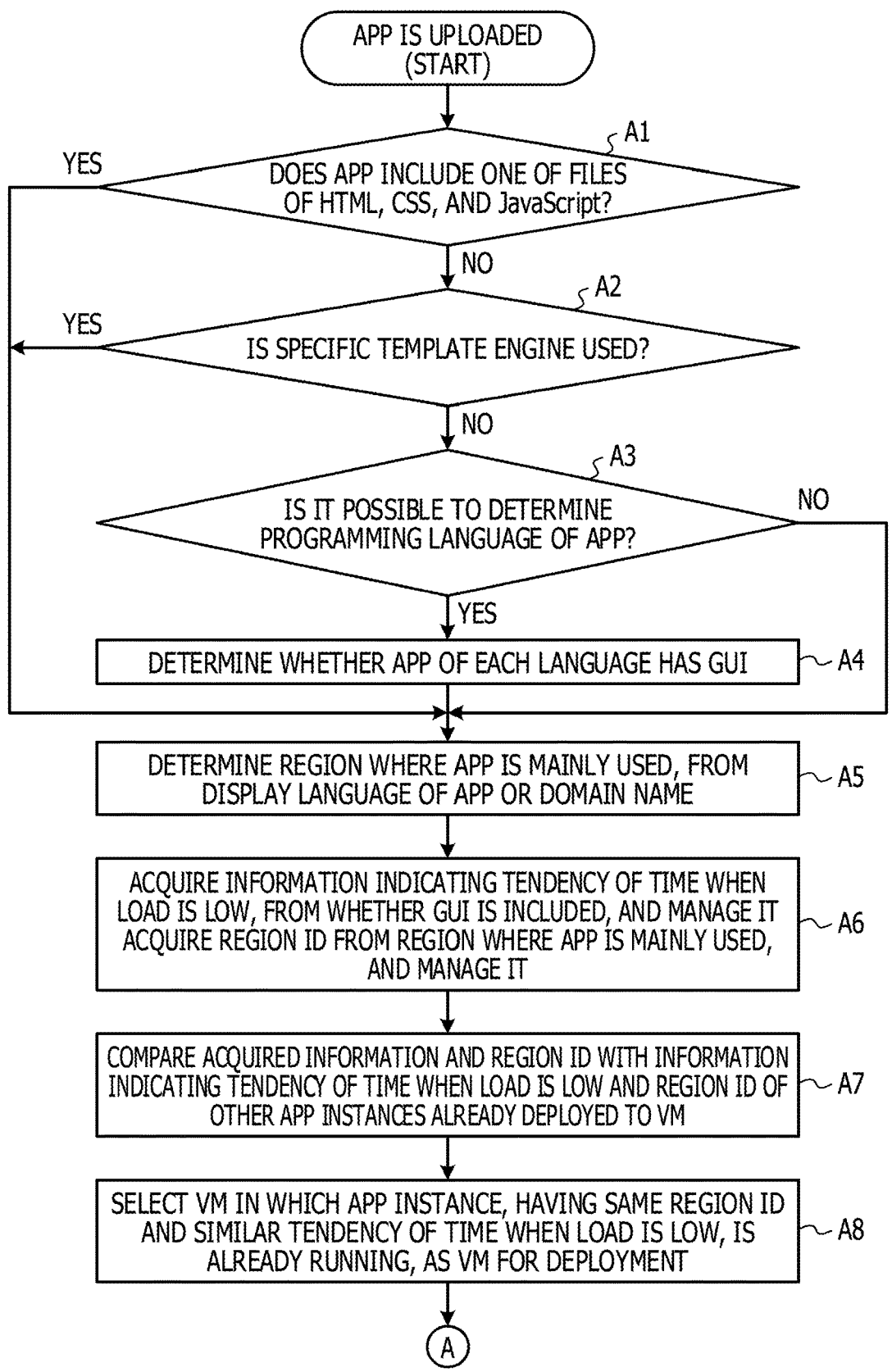
FIG. 6 is a flowchart for explaining a method of managing virtual machines using the virtual machine management apparatus as the example of the embodiment.
Figure 7:
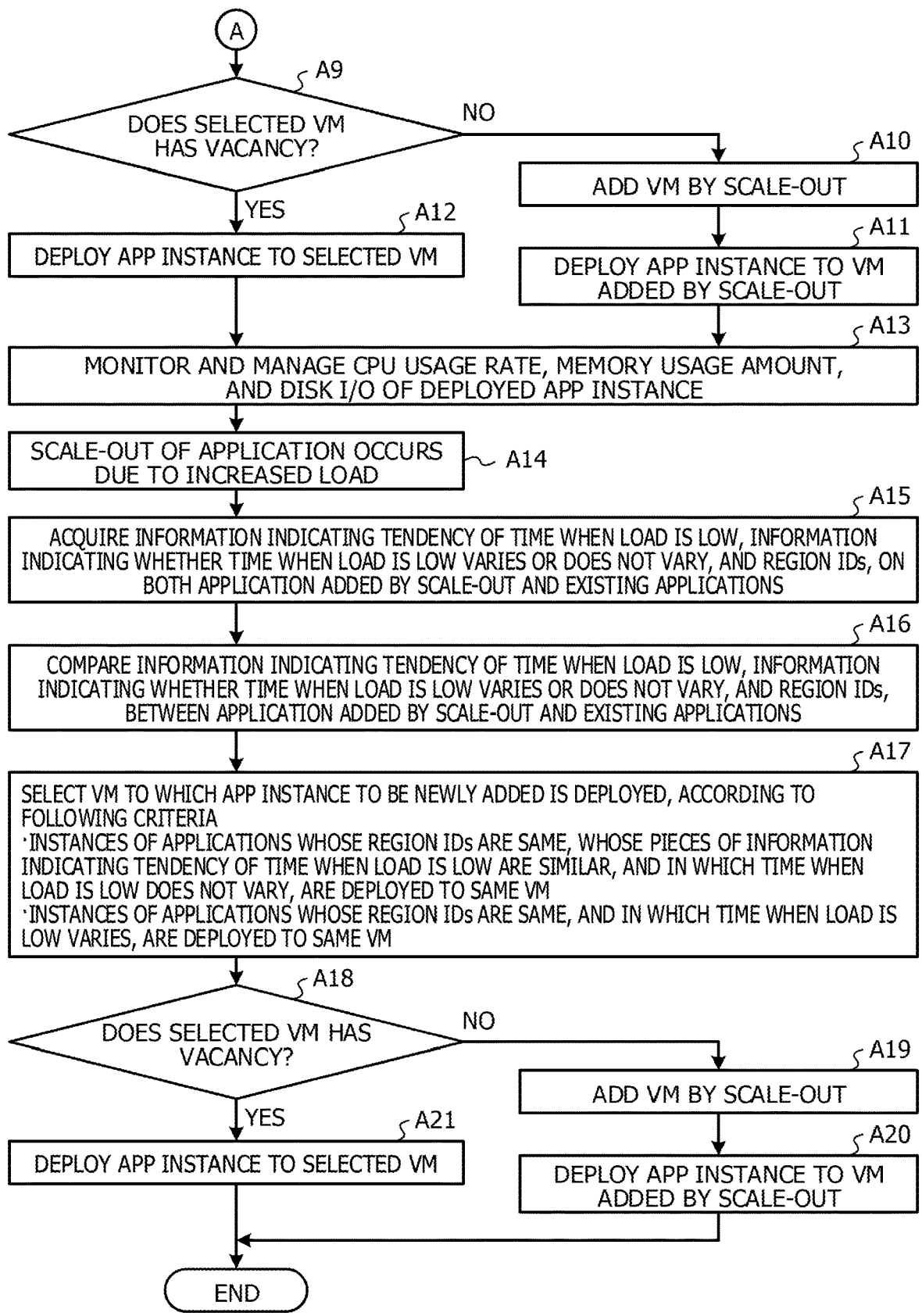
FIG. 7 is a flowchart for explaining the method of managing virtual machines using the virtual machine management apparatus as the example of the embodiment.

Descriptions are provided, following flowcharts (steps A1 to A21) in FIGS. 6 and 7, for a management method of virtual machines using the virtual machine management apparatus as an example of the embodiment, configured as described above. Note that FIG. 6 illustrates processing of steps A1 to A8, and FIG. 7 processing of steps A9 to A21.

When an application is uploaded from the developer terminal 5 to the management server 10, the GUI determination unit 211 determines whether the uploaded application (new application) has a GUI. In other words, at step A1, the GUI determination unit 211 checks if the uploaded new application includes one of files of HTML, CSS, and JavaScript (condition 1), based on the GUI determination condition 32.

If the new application does not include any of these files (see the NO route at step A1), the process proceeds to step A2. At step A2, the GUI determination unit 211 checks if the new application uses a specific template engine related to a GUI of Jade, HAML, Mustache, or the like (condition 2).

If the new application does not use such a template engine (see the NO route at step A2), the process proceeds to step A3. At step A3, the GUI determination unit 211 checks if it is possible to determine the programming language of the new application. If it is possible to determines the programming language of the new application (see the YES route at step A3), the process proceeds to step A4.

At step A4, the GUI determination unit 211 determines whether the new application has a GUI according to the determined programming language (condition 3). Then, at step A5, the region-characteristic determination unit 212 identifies the region in which the new application is mainly used, based on the display language used in the new application or the top domain.

As a result of checking at step A1, if the new application includes one of files of HTML, CSS, and JavaScript (see the YES route at step A1), the process proceeds to step A5. As a result of checking at step A2, also if the new application uses a specific template engine (see the YES route at step A2), the process proceeds to step A5.

Further, as a result of checking at step A3, also if it is impossible to determine the programming language of the new application (see the NO route at step A3), the process proceeds to step A5. At step A6, the GUI determination unit 211 sets the information indicating the tendency of the time when the load of the new application is low to the low-load-tendency estimation information 34 based on the determination result of whether the new application has a GUI, and manage the information.

In addition, the region-characteristic determination unit 212 determines a region ID based on the region in which the new application is mainly used, sets it in the region management information 35, and manages the region ID. At step A7, the assignment processing unit 22 refers to the low-load-tendency actual record information 36 and the low-load-tendency estimation information 34 to compare the information indicating the tendency of the time when the load of the new application is low and the region ID of the new application, with the information on existing applications indicating the tendencies of the times when the loads of other instances already deployed to VMs are low and the region IDs of these applications.

At step A8, the assignment processing unit 22 selects a VM in which instances of existing applications, which have the same region ID, and whose information indicating the tendency of the time when the load is low is similar or the same, are running, as a place for the instance of the new application to be disposed to. At step A9, the assignment processing unit 22 checks if the selected VM has an enough vacancy to add an instance. If the selected VM does not have a vacancy (see the NO route at step A9), the assignment processing unit 22 adds a VM by scale-out at step A10 and deploys the instance of the new application to the VM added by the scale-out, at step A11.

Then, at step A13, for the instance deployed to the VM, the load measurement unit 213 monitors the CPU usage rate, memory usage amount, and disk I/O of the node 2 executing this instance. Monitoring results obtained from this monitoring are stored and managed, for example, in the storage unit 30 as the low-load-tendency actual record information 36 along with the low-load-tendency estimation information 34 and the region management information 35.

On the other hand, as a result of checking at step A9, if the selected VM has a vacancy (see the YES route at step A9), the assignment processing unit 22, at step A12, deploys the instance of the uploaded application to the VM selected at step A8, and then the process proceeds to step A13. Then, assume that scale-out of the application occurs at step A14, for example, due to an increased load caused by an increasing number of accesses.

At step A15, for each of the application of which the scale-out occurred and existing applications, the assignment processing unit 22 refers to the low-load-tendency actual record information 36 to acquire the information indicating the tendency of the time when the load of each application is low. In addition, for these applications, the assignment processing unit 22 also acquires judgement results of whether the time when the load is low varies or does not vary.

At step A16, the assignment processing unit 22 compares the information indicating the tendency of the time when the load is low, whether the time when the load is low varies or does not vary, and the region ID, between the instance of each of the existing applications and the application added by scale-out.

At step A17, the assignment processing unit 22 selects a VM for the instance of the newly added application to be deployed to, following the foregoing criteria (1) and (2).

(1) Instances of applications whose region IDs are the same, whose pieces of information indicating the tendency of the time when the load is low are the same or similar, and in which the time when the load is low does not vary, are deployed to the same VM.

(2) Instances of applications whose region IDs are the same, and in which the time when the load is low varies are deployed to the same VM.

Then, at step A18, the assignment processing unit 22 checks if the VM selected at step A17 has an enough vacancy for an instance to be added. If the selected VM does not have a vacancy (see the NO route at step A18), the assignment processing unit 22 adds a VM by scale-out at step A19 and deploys at step A20 the instance of the uploaded application to the VM added by the scale-out.

On the other hand, as a result of checking at step A18, if the selected VM has a vacancy (see the YES route at step A18), the assignment processing unit 22 deploys the instance of the newly added application to the VM selected at step A17 (step A21), and the process ends.

(C) Effect

As described above, according to the computer system 1 as an example of the embodiment, when an application is uploaded or scale-out of an application is performed, the low-load-tendency determination unit 21 determines the tendency of the time when the load of the application is low, and the assignment processing unit 22 deploys the application such that instances of applications of which the tendencies of the times when the load is low are the same are gathered in the same VM.

This helps the loads of multiple instances deployed to a VM to become low at the same timing and makes it easy for a state where any instances are not operating in the VM to occur. This increases the number of chances to perform scale-in of a VM. Thus, it is possible to utilize VM resources efficiently. For instances of applications already assigned to VMs, the load measurement unit 213 measures the hardware load to execute each instance and creates the low-load-tendency actual record information 36. This makes it possible to determine the tendencies of the times of existing applications when the load along with executing the existing applications is low.

In addition, by the GUI determination unit 211 determining whether a new application uploaded to this computer system 1 has a GUI, it is possible to easily estimate the tendency of the time when the load of this new application is low. It is possible for the GUI determination unit 211 to easily determine whether the application has a GUI by judging whether the application includes one of files of HTML, CSS, and JavaScript (condition 1), or judging whether the application uses a specific template engine (for example, Jade, HAML, and Mustache) (condition 2).

Further, even in the case where it is impossible with these conditions 1 and 2 to determine whether the application has a GUI, the GUI determination unit 211 checks a GUI function according to the programming language of the application, and thus it is possible to easily determine whether the application has a GUI. In addition, the region-characteristic determination unit 212 determines what region the application is used in, and the assignment processing unit 22 deploys to the same VM, instances of applications of which the region for use are the same and in which the tendencies of the times when the load is low are the same. This is because if the regions for use are the same, it is thought that there is no time difference and the tendencies of the time when the load is low are the same.

The assignment processing unit 22 selects out of multiple VMs, a VM in which an instance of an application, whose region ID set in the region management information 35 is the same as that for the new application, and whose information indicating the tendency of the time when the load is low in the low-load-tendency estimation information 34 is the same as or similar to that for the new application, is already running, as a VM for the instance of the new application to be deployed to. This makes it possible for loads of applications corresponding to multiple instances assigned to a VM to be low at the same timing and thus possible to delete a VM by scale-in. Accordingly, it is possible to improve VM resource use efficiency. In addition, the assignment processing unit 22 selects, as a VM to which an instance of an application added by scale-out is deployed, a VM in which an instance of an application whose region ID is the same, whose information indicating the tendency of the time when the load is low is the same or similar, and in which the time when the load is low does not vary, is already running, out of multiple VMs.

Figure 8:
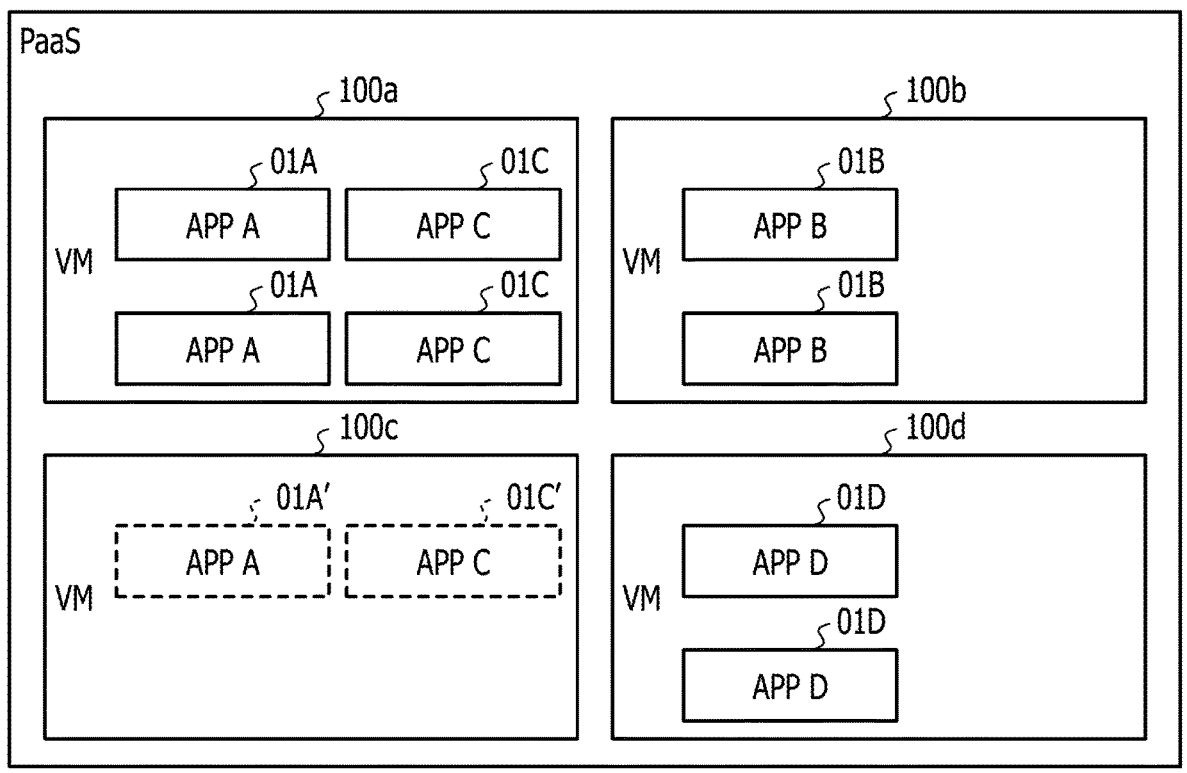
FIG. 8 is a diagram illustrating an example of deploying instances of applications to VMs by the management server functioning the virtual machine management apparatus as the example of the embodiment.

This also makes it possible for loads of applications corresponding to multiple instances assigned to a VM to be low at the same timing and thus possible to delete the VM by scale-in. Accordingly, it is possible to improve VM resource use efficiency. FIG. 8 is a diagram illustrating an example of deploying instances of applications to VMs in the management server functioning the virtual machine management apparatus as an example of the embodiment.

FIG. 8 illustrates an example of disposing instances of four applications A, B, C, and D to multiple VMs 100a, 100b, 100c, and 100d in a PaaS environment. In FIG. 8, reference signs 01A, 01B, 01C, and 01D denote instances of the applications A, B, C, and D, respectively. Hereinafter, an instance of the application A is referred to as an instance 01A using the reference sign 01A. Similarly, an instance of the application B is referred to as an instance 01B using the reference sign 01B, and an instance of the application C an instance 01C using the reference sign 01C. Also, an instance of the application D is referred to as an instance 01D using the reference sign 01D.

The applications A and C have the same tendency of the time when the load of the application is low. In addition, assume that the applications B and D have different tendencies of the time when the load of the application is low, from these applications A and C. As described above, the management server 10 deploys instances of applications of which the tendencies of the time when the load is low are the same, to the same VM. In the example illustrated in FIG. 8, since the applications A and C have the same tendency of the time when the load of the application is low, the instances 01A and 01C are deployed to the same VM 100a.

Note that deployed to the VM 100b are two instances 01B, and deployed to the VM 100d are two instances 01D. Here, after instances 01A' and 01C' are deployed to the VM 100c by scale-out, when these instances 01A' and 01C' are deleted by scale-in, there is no instance running in the VM 100c. Accordingly, it is possible to delete the VM 100c by scale-in, and thus to improve the VM resource use efficiency.

For example, assume that the application A is a web app of a word processor with a menu in the Japanese language, and that the application C is a web app of a spreadsheet with a menu in the Japanese language. It is thought that the loads of these user intervention type applications are low in the time zones corresponding the nighttime in Japan. Thus, by deleting the VM 100a and 100c by scale-in in the time zones corresponding to the nighttime in Japan, it is possible to allocate the VM resources to a user non-intervention type application, such as calculation, analysis, or the like, and thus to use the VM resources efficiently.

(D) Others

The present disclosure is not limited to the embodiment described above but may be modified in various ways without departing the spirit of the present disclosure. For example, although the above embodiment illustrates an example in which a PaaS environment is used as a virtualization system, the embodiment is not limited to this environment. Another virtualization system other than a PaaS environment may be used.

In addition, although in the example illustrated in FIG. 1, the computer system 1 includes the five nodes 2 and the management server 10, the embodiment is not limited to this. The computer system 1 may include four or less, or six or more nodes 2. In addition, the function as the management server 10 may be divided and located in multiple servers, or the management server 10 may be provided in a redundant manner. Moreover, although only one user terminal 4 and one developer terminal 5 are illustrated in the example illustrated in FIG. 1 for convenience, the embodiment is not limited to this. The number of the user terminals 4 or the developer terminals 5 may be two or more.

In addition, it is possible for those skilled in the art to implement or manufacture this embodiment using the disclosure described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A virtual machine management apparatus comprising:
a memory; and
a processor coupled to the memory and the processor configured to:
  determine, before an assignment of a first application to any of virtual machines, a first tendency of a time when a load associated with execution of the first application is low,
  perform, for each of applications that have been assigned to the virtual machines before the assignment of the first application, a determination of a second tendency of a time when a load associated with execution of each of applications is low,
  select a certain virtual machine from the virtual machines by comparing the first tendency of the time with the second tendency of the time, and
  perform the assignment of the first application to the selected certain virtual machine,
  wherein, when a programming language of the first application is not determined, each of the first tendency of the time and the second tendency of the time is determined by using a region in which the first application is used,
  wherein, when the programming language of the first application is determined, each of the first tendency of the time and the second tendency of the time is determined by using a region in which the first application is used and a feature which indicates whether the first application has a graphical user interface according to the programming language.

2. The virtual machine management apparatus according to claim 1, wherein the first application is different from each of the applications.

3. The virtual machine management apparatus according to claim 1, wherein the first tendency of the time is determined based on a region factor which corresponds to the first application.

4. The virtual machine management apparatus according to claim 1, wherein the determination of the second tendency includes:
determining the second tendency of the time when a load associated with execution of each of the applications is low based on a measurement result of a hardware load associated with execution of each of the applications.

5. The virtual machine management apparatus according to claim 1, wherein each of the second tendency of the time related to each of one or more applications assigned to the certain virtual machine is identical or similar to the first tendency of the time related to the first application.

6. The virtual machine management apparatus according to claim 1, wherein the assignment of the first application includes:
checking whether the certain virtual machine has available resources, and
adding a virtual machine when there is no available resource in the certain virtual machine.

7. A virtual machine management method executed by a computer, the method comprising:
determining, before an assignment of a first application to any of virtual machines, a first tendency of a time when a load associated with execution of the first application is low;
determining, for each of applications that have been assigned to the virtual machines before the assignment of the first application, a second tendency of a time when a load associated with execution of each of applications is low;
selecting a certain virtual machine from the virtual machines by comparing the first tendency of the time with the second tendency of the time; and
assigning the first application to the selected certain virtual machine,
wherein, when a programming language of the first application is not determined, each of the first tendency of the time and the second tendency of the time is determined by using a region in which the first application is used,
wherein, when the programming language of the first application is determined, each of the first tendency of the time and the second tendency of the time is determined by using a region in which the first application is used and a feature which indicates whether the first application has a graphical user interface according to the programming language.

8. The virtual machine management method according to claim 7, wherein the first application is different from each of the applications.

9. The virtual machine management method according to claim 7, wherein the first tendency of the time is determined based on a region factor which corresponds to the first application.

10. The virtual machine management method according to claim 7, wherein the determining includes:
   determining the second tendency of the time when a load associated with execution of each of the applications is low based on a measurement result of a hardware load associated with execution of each of the plurality of applications.

11. The virtual machine management method according to claim 7, wherein each of the second tendency of the time related to each of one or more applications assigned to the certain virtual machine is identical or similar to the first tendency of the time related to the first application.

12. The virtual machine management method according to claim 7, wherein the assigning includes:
   checking whether the certain virtual machine has available resources, and
   adding a virtual machine when there is no available resource in the certain virtual machine.

13. A non-transitory computer-readable medium storing a program that causes a computer to execute a process comprising:
   determining, before an assignment of a first application to any of virtual machines, a first tendency of a time when a load associated with execution of the first application is low;
   determining, for each of applications that have been assigned to the virtual machines before the assignment of the first application, a second tendency of a time when a load associated with execution of each of applications is low;
   selecting a certain virtual machine from the virtual machines by comparing the first tendency of the time with the second tendency of the time; and
   assigning the first application to the selected certain virtual machine,
   wherein, when a programming language of the first application is not determined, each of the first tendency of the time and the second tendency of the time is determined by using a region in which the first application is used,
   wherein, when the programming language of the first application is determined, each of the first tendency of the time and the second tendency of the time is determined by using a region in which the first application is used and a feature which indicates whether the first application has a graphical user interface according to the programming language.

* * * * *